May 16, 1967     T. E. ELBERT     3,319,473
GYROSCOPE ASSEMBLY
Filed May 20, 1963
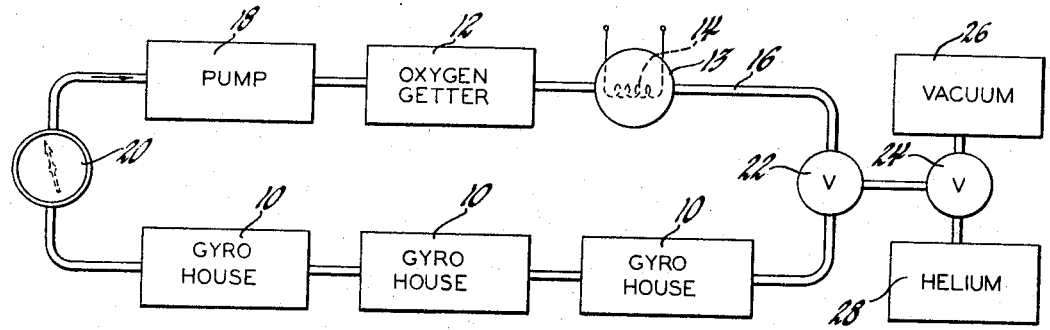
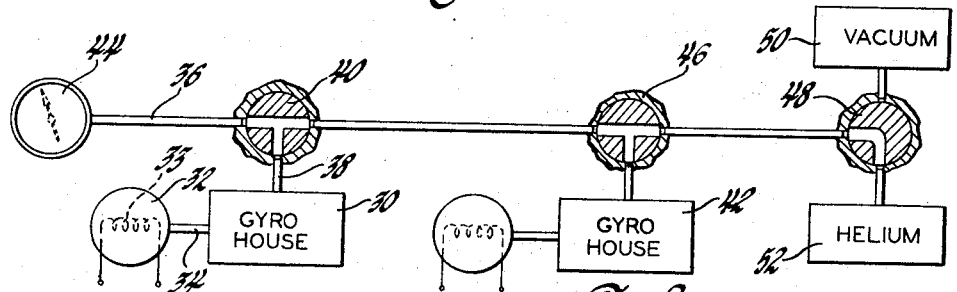
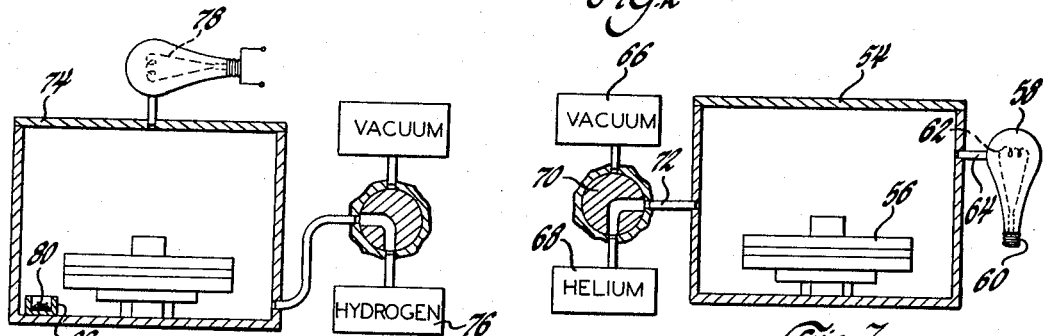
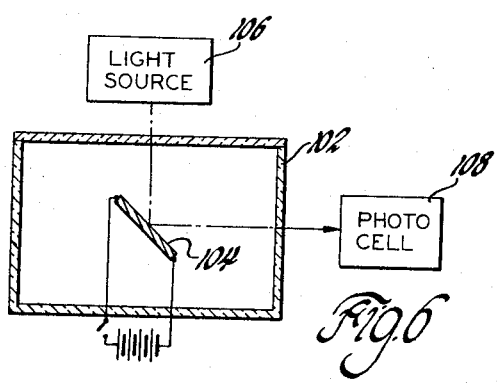
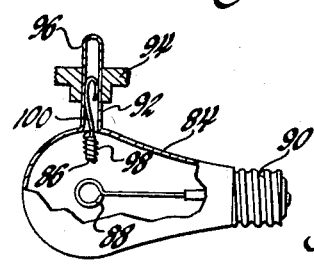
INVENTOR.
Thomas E. Elbert
BY
*L. J. Wallace*
ATTORNEY United States Patent Office 3,319,473
Patented May 16, 1967

3,319,473
GYROSCOPE ASSEMBLY
Thomas E. Elbert, Milwaukee, Wis., assignor to General Motors Corporation, Detroit, Mich., a corporation of Delaware
Filed May 20, 1963, Ser. No. 281,403
17 Claims. (Cl. 74—5)

This invention relates to gyroscopes and more particularly to a process and apparatus useful in prolonging life of gyroscopes used in inertial guidance systems.

As pointed out in United States patent application Ser. No. 290,270, entitled, "A Process and Apparatus for Improved Gyroscope Operation," which is being filed simultaneously herewith and which is assigned to the assignee of the present application, it is extremely important to operate a precision bearing assembly, such as a gyroscope-type rolling contact bearing assembly, in an extremely low oxygen atmosphere. This atmosphere must not only be just extremely low in oxygen, but the oxygen concentration in a normal pressure atmosphere must be maintained below about 0.03 part per million. Atmospheres having a higher oxygen pressure induce changes in gyro bearing operation, which cause changes in gyroscope performance. Hence, changes in gyroscope stability result. Obviously, it is essential that gyroscopes should be as stable in operation as is possible to attain. Accordingly, in precision bearing assemblies, such as those used in gyroscopes for inertial guidance systems, it is of extreme importance that the bearing assembly be run in an atmosphere having the described extremely low oxygen level.

However, such an atmosphere is not readily attainable. It is acquired only by a tedious process conducted with great care. However, the establishment of such an atmosphere, and the running of the gyroscopes in it, provides increased gyro life. However, an even greater benefit is attainable by continuing oxygen removal while the gyro is operating. I have found that regardless of the nature of the initially established low level oxygen environment, it is only under unusual conditions that such an environment can be maintained, unless one continues to remove oxygen from it. I have found that, in most instances, the oxygen level in a system will rise regardless of the meticulous care taken in initially preparing the low oxygen atmosphere for that system. Continued slow outgassing of materials in and forming the enclosure for the system as well as imperfect seals in the system contribute to the incerase in oxygen level, after the atmosphere has been established. Consequently, I have found increased advantage in not only concurrently removing oxygen from the atmosphere in which the gyroscope is run but also by limiting the atmosphere quantum in which the gyroscope is run and continuously removing oxygen from that quantum during operation of the gyroscope.

Hence, gyroscope stability can be vastly increased by operating it in the low oxygen atmosphere. However, an even greater increase in gyroscope life can be attained if the atmosphere is continuously scavenged of oxygen. Moreover, an even greater improvement in life is attainable if the gyroscope is run in a given atmosphere quantum which is continuously scavenged of oxygen during operation of the gyroscopes.

It is, therefore, a principal object of this invention to provide means for improving the life of a gyroscope. Among the more specific objects of the invention are the provision of both a method and an apparatus for operating a precision bearing assembly, such as a gyroscope-type rolling contact bearing assembly, in an atmosphere which is being scavenged of oxygen to maintain a predetermined oxygen level. Other objects are to provide means for scavenging, for monitoring and for measuring the oxygen concentration in environments for operating gyroscopes.

These and other objects of the invention will become more apparent from the following description of preferred embodiments thereof and from the drawing, in which:

FIGURE 1 shows a diagrammatic view of a system for running in a gyroscope while removing oxygen from the system;

FIGURE 2 shows a diagrammatic view of a modification of the system shown in FIGURE 1;

FIGURE 3 shows a schematic view of a "run-in" house, incorporating the invention;

FIGURE 4 shows a schematic view of a gyro "run-in" house, such as shown in FIGURES 1 and 2;

FIGURE 5 shows an oxygen getter useful in the invention; and

FIGURE 6 shows a combination oxygen getter and oxygen level measuring device.

This invention is of particular importance in the manufacture of highly sensitive inertial guidance system gyroscopes which are operated for hundreds of hours before they are actually used. The gyroscope rotor, stator and supporting bearing assembly is "run-in," operated at the speed of intended use, for hundreds of hours until the operating characteristics are stabilized. This "run-in" time can comprise a major proportion of the overall time the gyroscope is operated for its entire useful life. It is in this area where my invention is especially useful. The gyroscopes are "run-in" in individual enclosures which are referred to as "run-in houses." A plurality of housings ordinarily communicate with a single evacuating means and a single source of light gas through a manifold arrangement. I have found that it is virtually impossible to retain the desired extremely low oxygen level in such a system for several hundred hours without oxygen scavenge during this time. Reference is now made to FIGURE 1 which shows an embodiment of a system which I prefer for "running-in" gyroscopes.

In FIGURE 1 there is shown a plurality of gyro houses 10 in communication with an oxygen getter 12 and a bulb 13 containing tungsten filament 14 by means of a conduit 16. A pump 18 circulates the atmosphere in the system from the gyro houses 10 over the oxygen getter 12 and the tungsten filament 14. Gage 20 is used to measure pressure in the system. Valves 22 and 24 communicate the system with a system evacuating means 26. A source of helium 28, preferably as pure as is possible, is used to backfill the system once it has been evacuated by vacuum means 26 to thereby provide a light gas atmosphere in the system. A gyroscope rotor, stator and bearing assembly (not shown) is disposed in each of the gyro housings 10.

When one desires to "run-in" a gyroscope, it is placed in a gyro house 10 and the house is closed, sealing the house. Valve 22 is opened and valve 24 adjusted to communicate the system with the vacuum means 26. When a sufficiently low pressure has been achieved in the system, valve 22 is closed. It is desired to hold the system in an evacuated state for a while to allow for outgassing of oxygen from the materials in and forming the enclosure for the system. This includes, of course, the "run-in" houses 10, the gyroscope components (not shown), the oxygen getter 12, the tungsten filament 14, the conduit 16 and the pump 18, as well as the pressure gage 20. Generally, the longer this holding period is the better. After the holding period, valve 24 is adjusted to communicate the system with the source of helium 28. The valve 22 is then reopened, whereby helium is introduced into the system. When a sufficient helium pressure, such as 0.1–1 atmosphere has been achieved in the system, valve 22 is closed. This evacuation, holding and subsequent backfilling with helium can be accomplished as many times as is needed to attain the desired oxygen level in the system.

While it is appreciated that a plurality of successive evacuations and backfillings with the light gas eventually can reduce the initial oxygen concentrations to as low as is desired, this is not sufficient to produce a satisfactory environment unless the repeated evacuations and purgings are conducted for a sufficient duration to also remove a substantial portion of the absorbed and adsorbed air.

The following procedure serves as a specific example of one method by which an atmosphere containing less than about .002 part per million oxygen can be attained. In contrast to the prior atmosphere replacement methods, this procedure is rigidly controlled and substantially more extensive in nature. A more effective replacement is attained by maintaining the system at an elevated temperature during the entire replacement procedure. Hence, when convenient, I prefer to heat the system, or critical parts thereof, to a temperature of about 165° F. The system in which the gyroscope is to be "run-in" is made vacuum tight, all lines are exhausted of air. The system is evacuated to a pressure of approximately 0.01–0.1 micron of mercury and maintained at this pressure for approximately 20 to 24 hours. The system is then backfilled with the light gas to a pressure of from about 0.5–1 atmosphere. The system is then re-evacuated to a pressure of approximately 0.01–0.1 micron of mercury and held there for about one hour. The system is then refilled with the light gas to a pressure of 0.5–1 atmosphere and evacuated again to a pressure of about 0.01–0.1 micron of mercury, where it is maintained for about one hour. The system is again backfilled with the light gas to a pressure of about 0.1–1 atmosphere and the system closed. That quantum of atmosphere in the system is then exposed to oxygen getters for approximately 50 to 80 hours. The exposure of the atmosphere to the oxygen getter is accomplished by circulating the atmosphere over sodium, potassium or the like, or any other convenient manner. The system is then ready to "run-in" the gyroscope assembly.

The pump 18 is used to induce a flow of the helium atmosphere in the system over the oxygen getter 12 and the tungsten filament 14 through the "run-in" houses 10 and back to the pump. When the oxygen concentration is low enough, the tungsten filament 14 is electrically heated, but not necessarily to incandescence or even to a dull red heat. The gyroscopes are then started in operation. During the "run-in" of the gyroscope, the pump continuously recirculates the atmosphere in the system over the oxygen getter 12 and the heated tungsten filament 14. When the gyroscope has been completely "run-in," the circulation is stopped, and the gyro housing opened and the gyro removed. Among those materials which can be used as an oxygen getter are molten potassium, a 75% potassium-25% sodium eutectic mixture, by weight, that is molten at room temperature, hot tungsten, fresh calcium chips, hydrogen reduced copper turnings, and the like. The tungsten filament 14 also serves as an oxygen getter. However, its primary purpose in the FIGURE 1 embodiment of the invention is to monitor the oxygen level in the helium atmosphere. If the oxygen level should reach undesirably high levels, the oxygen in the system passing over the filament will react with the tungsten to oxidize it. In so doing, it initially tarnishes and then eventually consumes the tungsten filament. Any of many commercially available incandescent tungsten filament light bulbs can be used to register oxygen levels within the scope of the invention. Differences in the diameter of wire used in the filament of various light bulbs are not significant unless one is heating the filament to incandescence and measuring when incandescence ceases. In the latter instance, of course, an initial determination may be required to determine the exact oxygen concentration at which the light bulb will burn out under the current being passed through the filament. The current can be adjusted, if necessary, to reduce the temperature of the filament and, hence, its sensitivity to oxygen.

FIGURE 2 shows a modification of the invention in which the atmospheres in the gyro houses are isolated from one another. Each gyro house has its own atmosphere quantum and its own means for maintaining and monitoring the oxygen level in that atmosphere. The gyro house 30 communicates with a bulb 32 having a tungsten filament 33 by means of a communicating passage 34. The bulb 32, being of glass or the like, forms a suitable transparent enclosure for the tungsten filament 33. As in FIGURE 1, the tungsten filament is electrically heated. The gyro house 30 communicates with manifold 36 via the interconnecting conduit 38 and valve 40. The gyro house 42 is similarly constructed and connected to manifold 36. A gage 44 is used to determine pressure in the manifold 36. By appropriately adjusting valves 40, 46 and 48, either or both of the gyro houses 30 and 42 can be placed in direct communication with evacuating means 50 or the source of helium 52.

The desired low oxygen atmosphere within the gyroscope can be established in each of the gyro houses 30 and 42 in the manner used to establish it in the system shown in FIGURE 1. However, once the atmosphere has been established, valve 40 is adjusted to isolate gyroscope housing 30 from the balance of the system shown in FIGURE 2. Similarly, appropriate adjustment of valve 48 isolates gyroscope housing 42 from the balance of the system. Current is intermittently passed through the tungsten filament 33, alternately heating it, and then allowing it to cool. The filament is heated long enough to warm the atmosphere in the bulb 32 surrounding the tungsten filament 33. Heating durations of 2 to 5 seconds are ordinarily sufficient. I prefer to heat the tungsten filament in this manner about 15 times per minute with about equal heating and cooling periods. In this manner, a pulsation effect is attained in which heated gas in the bulb 32 expands through passage 34 into the gyro house 30. On cooling, the gas around the tungsten filament contracts, causing gas to flow back from the gyro house 30 through the passage 34 into the bulb 32. In this manner the gas within the gyro house is continuously being scavenged of any oxygen which might be introduced into its atmosphere. While the atmosphere in the gyroscope housing 30 is being scavenged of oxygen, the gyroscope therein (not shown) is "run-in." All during this operation, even though it may extend for several hundred hours, the oxygen is being continuously removed to maintain the desired oxygen level. This same operation is applicable to the gyroscope and atmosphere in gyroscope housing 42.

FIGURE 3 shows in more detail a gyro house, such as schematically shown in FIGURE 2. The gyro house 54 supports a gyroscope assembly 56 which includes a rotor, stator and matching bearing assembly. This is the assembly that must be "run-in" before a gyroscope achieves the precise opearting stability that is necessary for precision inertial guidance systems. The gyro house 54 communicates with a conventional light bulb 58, such as a 100 A/CL or 150 A/CL General Electric or Westinghouse incandescent light bulb. The bulb, of course, has a base 60 which can be threaded into a conventional socket and a tungsten filament 62. The bulb 58 communicates with the gyro house 54 by means of a passage 64 therebetween. Analogous to the embodiments shown in FIGURES 1 and 2, the gyro house 54 alternately communicates with an evacuating means 66 and a source of helium 68 through valve 70 and interconnecting passage 72.

The helium atmosphere can be established and the gyro "run-in" in the same manner as described in connection with FIGURES 1 and 2. The operation of the gyroscope and concurrent scavenging of oxygen is accomplished as described in FIGURE 2 wherein intermittent heating of the light bulb causes a pumping action to continuously withdraw atmosphere from the "run-in" house, remove oxygen from it, and then pump the atmosphere back into the "run-in" house.

The apparatus shown in FIGURE 4 is essentially the same as that shown in FIGURE 3. However, it differs from that shown in FIGURE 3 in that the gyro house 74 is connected to a source of hydrogen 76 rather than helium. Hence, the gyroscope is operated in a hydrogen rather than a helium atmosphere. In such instance, the gettering action of the hot tungsten filament 78 is assisted by the hot hydrogen atmosphere around the filament. The hot hydrogen combines with oxygen to form water. The water produced is absorbed by the desiccant 80, such as potassium or sodium, contained in the cup 82 within the gyro house 74. Thus, the apparatus in FIGURE 4 is operated essentially the same as described in connection with FIGURE 3.

FIGURE 5 shows a tungsten filament light bulb which has been modified to be used in a gyroscope housing, such as shown in FIGURE 3. In this instance, however, the glass bulb 84, itself, is provided with a supplementary getter 86 to aid the tungsten filament 88 in scavenging oxygen. As in the usual commercial light bulbs, the bulb 84 has a threaded base portion 90 for both supporting the bulb and electrically connecting the tungsten filament 88 to a source of electrical current. The bulb 84 has a tubular glass projection 92 thereon on which is secured connector element 94. The connector element 94 is used to secure the bulb assembly to the gyro housing in which it is going to be used. The connector member 94 is preferably rotatable on the projection 92 to facilitate assembly of the bulb to the gyro housing in which it is used. After the member 94 is connected to the gyro housing, the annular space between the member 94 and the projection is sealed with sealing wax, cement, or the like. Of course, in the alternative, this sealing can be done in any convenient manner before installation of the bulb assembly. The end 96 of the projection 92 is closed to maintain whatever atmosphere is desired within the bulb 84. It can be maintained in an evacuated state, or the bulb can be filled with the light gas which is to be used in the gyro house. When the bulb is to be used, the end 96 is scribed and broken off in the usual manner for "cutting" glass tubing.

The oxygen getter 86 is disposed in the coil 98 which has a supporting extension 100 that lies within the bulb projection 92. Sodium, lithium or potassium can be used as the getter. The getter 86 lies close to the tungsten filament 88, so that when the heat of the incandescent filament melts the getter, the molten getter will cling to the supporting coil 98. As the tungsten filament is periodically heated, the pumping action induced thereby moves atmopshere back and forth through the tube 92 and over the molten getter 86.

Hence, in this embodiment of the invention, both the tungsten filament and the molten getter serve to remove oxygen from the atmosphere. However, in addition, the tungsten filament serves as a means for monitoring the oxygen concentration. If the oxygen level should rise undesirably high, the tungsten filament will initially tarnish and eventually be consumed, signaling that this high oxygen level condition is present. Either the tarnishing or the consumption effect can be used to identify the high oxygen condition.

The tungsten filament 88 in the bulb 84 is highly reflective when initially used. With increasing oxidation, the reflectivity of the tungsten decreases. This change in reflectivity can be noted during the dark period between "flashes" of the filament, i.e., between periods when it is being heated to incandescence. As a practical matter, it may be desirable to interrupt the flashing from time to time to obtain greater time to examine the filament to determine changes in its exterior appearance from the bright reflective surface to the frosty nonreflective (oxidized) surface. Thus, there is provided an even more sensitive technique for measuring oxygen concentration than by allowing the filament to become completely oxidized, so as to stop incandescing. Much lower levels of oxygen can be readily qualitatively detected by this technique.

On the other hand, this more sensitive technique can also be used to quantiatively measure oxygen. One can provide a supplementary tungsten member, such as a film or thin strip, to more accurately measure the oxygen level by changes in surface reflectivity of the tungsten member. FIGURE 6 shows the manner in which this is accomplished. A glass enclosure 102 has an electrically heated tungsten strip 104 therein. A light source 106 directs a beam of light onto the tungsten member 104. Light is reflected from the tungsten member to a photocell 108, which registers the intensity of the reflected light. The tungsten filament is preferably not being heated to incandescence when the reflectivity measurement is taken. The changes in reflectivity registered by the photocell can be readily calibrated for the particular environment involved to provide an accurate measure of oxygen level.

Even extremely minute amounts of oxygen can have a highly detrimental effect on a precision bearing assembly such as a gyroscope bearing assembly. For example, the life of tolerable gyroscope performance can be increased tenfold merely by running it in an environment containing less than about 0.03 part per million of oxygen, for each 3 to 6 milligrams of oil used in lubricating the bearing. Moreover, I have found that, the oxidation rate being equal to the oxygen in-leak rate, a level of less than 0.002 part per million will produce a life of tolerable gyroscope performance greater than 10,000 hours.

It appears that the oxygen contained in the light gas environments gyroscopes customarily are operated in is sufficient to detrimentally react with the oil lubricating the rolling element bearing assemblies supporting the gyroscope. Eventually an oil oxidation product is formed in sufficient quantity on the assembly to result in erratic momentary changes in rotor axis disposition of greater magnitude than the original drift inherent in the gyroscope when made, i.e., jogs. Therefore, the net result is a lesser sensitivity in the gyroscope. Once the oil degradation products form sufficiently, the jogs become large enough to reduce the sensitivity of the gyroscope beyond tolerable limits of its system. Reducing the concentration of the oxygen to less than about .002 part per million and maintaining it at this level, in effect, reduces the rate of lubricant oxidation to a point where it is no longer an existing problem.

Gyroscope assemblies are frequently enclosed within and supported by a sealed canister which is suspended in a medium having a specific gravity substantially the same as the apparent specific gravity of the canister. Hence, the canister is generally referred to as a "float." Hence, in order to incorporate my preferred invention in such a gyroscope assembly I contemplate a float having means for maintaining an oxygen level at less than about 0.03, and preferably less than approximately .002 part per million.

Another way to reduce lubricant degradation product build up on the bearings is by limiting the volume of oxygen which is available for contact with the bearing assembly. This volume must be less than that which is sufficient to form enough of the oil oxidation product to deleteriously alter gyroscope performance. The oxygen volume is reduced if the total atmosphere volume is reduced. The total atmosphere volume can be reduced in various ways. The gyroscope enclosure can be made smaller, its configuration can be changed to have a lesser interior volume, etc. This may be somewhat meaningful with higher oxygen concentrations, for example, about 0.03 part per million. However, with lower oxygen concentrations, the variation in atmosphere quantity is of correspondingly lesser significance. At 0.002 part per million of oxygen, variation in overall atmosphere volume has little or no effect.

Analogously, the volume of lubricant can be reduced.

However, it apparently takes only a very small amount of lubricant to form enough oxidation product to produce a jog. This prevails even in the gyroscope rolling element bearing assemblies where the amount of lubricant within the float is generally quite small. Only enough lubricant is applied to each gyroscope ball bearing assembly as will adhere to it at operating speed. Each of the gyroscopes for the Titan missile guidance system, for example, has two ball bearing assemblies supporting it. Each bearing assembly is lubricated with about 1.5 to 4 milligrams of lubricant. This is typical of many gyroscopes presently in use for inertial guidance systems. However, only 2% to 5% of this amount of lubricant is actually used in the working part of the bearings. For the higher oxygen concentrations, the total amount of oxygen is preferably not more than 5%, by weight, of the smallest amount of lubricant actually used. This amount of oxygen preferably should not be available at a rate greater than the preferred total amount of oxygen divided by ten times the desired bearing life. For the Titan 2FBG (Floated Beryllium Gyro) bearing, this amounts to 0.001 cc. of oxygen at standard temperature and pressure. Of course, if the oxygen level can be maintained at lower concentrations, especially at about 0.002 part per million, or below, variation in the total volume of oxygen produces negligible effects.

It is significant that by controlling oxygen level, or oxygen pressure in an absolute sense, life of the gyro bearing can be increased, regardless of size of the bearing, quantity of oxygen, quantity of lubricant or the like. One merely reduces and maintains the oxygen concentration to below about .002 part per million. The rate of oxygen degradation of the lubricant is diminished to such an extent that regardless of what quantity of atmosphere is used, a large improvement is certain to be obtained. The extent of the improvement, of course, can be affected by atmosphere volume, in some instances, but the effect is merely to limit the extent of the improvement. Accordingly, in order to insure maximum benefit is attained by the invention, I prefer to use an oxygen concentration below .002 part per million in an atmosphere volume which does not contain more than about 0.5% of the actual weight of lubricant used in weight of oxygen at standard temperature and pressure.

It is to be understood that although this invention has been described in connection with certain specific examples thereof, no limitation is intended thereby except as defined in the appended claims.

I claim:
1. A device for operating a precision bearing assembly comprising a sealed enclosure, a precision rolling contact bearing assembly in said enclosure, said enclosure having an atmosphere with an oxygen concentration lesser than about 0.03 part per million and means in said enclosure for maintaining said oxygen concentration below about 0.03 part per million.

2. The device described in claim 1 wherein the means for maintaining said oxygen concentration is a heated tungsten member.

3. A device which comprises a sealed enclosure, a precision rolling contact bearing assembly in said enclosure, a quantity of lubricant on said bearing assembly not substantially greater than that which will adhere thereto during running of said assembly, an atmosphere in said enclosure having an oxygen concentration lesser than about 0.03 part per million, the total oxygen content of said atmosphere being less than about 0.5% of the actual weight of lubricant used by said bearing assembly, and in said enclosure means for maintaining the stated oxygen concentration and volume.

4. The device recited in claim 3 in which the means for maintaining the stated oxygen concentration and volume is a heated tungsten member.

5. A device for operating a precision bearing assembly comprising a sealed enclosure, a precision rolling contact bearing assembly in said enclosure, said enclosure having an atmosphere with an oxygen concentration less than about 0.002 part per million, and means in said enclosure for maintaining said oxygen concentration below about 0.002 part per million.

6. The device described in claim 5 in which the means for maintaining the staged oxygen concentration is a heated tungsten member.

7. A gyroscope assembly which comprises a sealed enclosure for a gyroscope, a gyroscope in said enclosure, at least one rolling element bearing assembly rotatably supporting said gyroscope in said enclosure, a quantity of lubricant on each bearing assembly not substantially greater than that which will adhere to said bearing assembly during running thereof, an atmosphere in said enclosure having an oxygen concentration less than about 0.002 part per million, and means in said enclosure for maintaining the oxygen concentration less than about 0.002 part per million.

8. A device for running-in gyroscopes comprising in enclosure, a first chamber in said enclosure, means in said first chamber for supporting a gyroscope assembly on its bearings, a second chamber in said enclosure, means in said second chamber for removing oxygen from the atmosphere therein, means for communicating said chambers, and means for inducing the flow of atmosphere from said second chamber into said first chamber through said communicating means.

9. A device for running-in gyroscopes comprising an enclosure, means for establishing said enclosure an atmosphere having an oxygen concentration less than 0.03 part per million, a first chamber in said enclosure, means in said first chamber for supporting a gyroscope assembly on its bearings, a second chamber in said enclosure, means in said second chamber for maintaining the oxygen concentration of said enclosure less than about 0.03 part per million, means for communicating said chambers, and means for indicating the flow of atmosphere from said second chamber into said first chamber through said communicating means.

10. A device for running-in gyroscopes comprising an enclosure, a first chamber in said enclosure, means in said first chamber for supporting a gyroscope on its bearings, a second chamber in said enclosure, a heated tungsten member in said second chamber, means for passing electrical current through said member, means for communicating said chambers, and means for inducing the flow of atmosphere from said second chamber into said first chamber through said communicating means.

11. A device for operating a gyroscope comprising an enclosure, an atmosphere containing hydrogen in said enclosure, means in said enclosure for supporting a gyroscope on its bearings, means in said enclosure for reacting the hydrogen of said atmosphere with oxygen to form water, and means in said enclosure for absorbing said water.

12. The method which comprises placing a precision bearing assembly in an enclosure, providing said enclosure with an atmosphere having an oxygen concentration less than about 0.03 part per million, sealing said enclosure, operating said bearing assembly, and concurrently maintaining the oxygen concentration in said sealed enclosure below about 0.03 part per million.

13. The method which comprises placing a precision bearing assembly in an enclosure, providing said enclosure with a light gas atmosphere having an oxygen concentration less than about 0.002 part per million, sealing said enclosure, operating said bearing assembly, and concurrently maintaining the oxygen concentration in said sealed enclosure below about 0.002 part per million.

14. The method of operating a gyroscope which is supported by at least one rolling contact bearing assembly, said method comprising the steps of placing said gyroscope with its supporting bearing assembly in an enclosure, applying a quantity of lubricant to said bearing assembly not substantially greater than that which will adhere thereto during operation of said gyroscope, providing in said enclosure a light gas atmosphere having an oxygen concentration less than about 0.03 part per million, the total oxygen content of said atmosphere not being greater than about 0.5% of the actual weight of lubricant used by said bearing assembly, sealing said enclosure, operating said gyroscope, and concurrently maintaining the oxygen concentration in said enclosure below about 0.03 part per million.

15. The method as defined by claim 12 in which a tungsten member is heated to at least assist in maintaining the seated oxygen concentration in the sealed enclosure.

16. The method as defined in claim 12 in which a tungsten member is periodically flashed to at least assist in maintaining the stated oxygen concentration.

17. The method as defined in claim 12 in which reduction in surface brightness of the tungsten member is used to monitor oxygen concentration.

References Cited by the Examiner

UNITED STATES PATENTS

| | | | |
|---|---|---|---|
| 1,240,700 | 9/1917 | Friederich | 252—181.6 X |
| 1,624,077 | 4/1927 | Sproesser | 252—181.6 X |
| 2,332,337 | 10/1943 | Norton | 23—2.3 |
| 2,711,356 | 6/1955 | Ensinger | 74—5 X |

OTHER REFERENCES

"The Behavior of Lubricated Ball Bearings in Controlled Atmospheres." W. A. Glaeser. Lubrication Engineering February 1960, pp. 56–60.

"Purification of the Rare Gases," D. S. Gibbs et al. Industrial and Engineering Chemistry, February 1956, pp. 281–296.

FRED C. MATTERN, Jr., *Primary Examiner.*

BROUGHTON G. DURHAM, *Examiner.*

K. DOOD, J. D. PUFFER, *Assistant Examiners.*

UNITED STATES PATENT OFFICE
CERTIFICATE OF CORRECTION

Patent No. 3,319,473                                          May 16, 1967

Thomas E. Elbert

It is hereby certified that error appears in the above numbered patent requiring correction and that the said Letters Patent should read as corrected below.

Column 8, line 8, for "staged" read -- stated --; line 39, for "indicating" read -- inducing --; column 9, line 14, for "seated" read -- stated --.

Signed and sealed this 21st day of November 1967.

(SEAL)
Attest:

Edward M. Fletcher, Jr.                                 EDWARD J. BRENNER
Attesting Officer                                              Commissioner of Patents